United States Patent [19]

Jeong

[11] Patent Number: 5,774,436
[45] Date of Patent: Jun. 30, 1998

[54] METHOD OF TRANSMITTING IDENTIFICATION DATA FOR SERVO CONTROL IN A DISC PLAYER

[75] Inventor: Jong-Sik Jeong, Seoul, Rep. of Korea

[73] Assignee: Samsung Electronics Co., Ltd., Kyungki-do, Rep. of Korea

[21] Appl. No.: 783,702

[22] Filed: Jan. 15, 1997

[30] Foreign Application Priority Data

Jan. 15, 1996 [KR] Rep. of Korea .......................... 96-632

[51] Int. Cl.⁶ ..................................................... G11B 7/00
[52] U.S. Cl. ............................................. 369/50; 369/54
[58] Field of Search ................................. 369/50, 48, 54, 369/124, 32, 58, 47; 360/48, 77.05, 77.06, 77.07, 72.2, 73.03, 78.14

[56] References Cited

U.S. PATENT DOCUMENTS 4,829,497   5/1989   Sako et al. .............................. 359/50

*Primary Examiner*—Thang V. Tran
*Attorney, Agent, or Firm*—Sughrue, Mion, Zinn, Macpeak & Seas, PLLC

[57] ABSTRACT

An identification (ID) data transmission method for use in a disc player for performing servo control operations. An ID decoder reads and decodes the ID data from a signal recorded on an optical disc, and outputs the decoded ID data at a constant transmission rate to a microprocessor for controlling servo operations. The microprocessor compares the ID data transmission rate with an ID data processing rate of the microprocessor in the servo control, and controls the ID data transmission rate of the ID decoder based on the result of the comparison.. The disc player can efficiently perform timing and control of programs in the microprocessor.

10 Claims, 1 Drawing Sheet

FIG. 2A  IRQ

FIG. 2B  MODE CLOCK
MODE DATA

FIG. 2C  CLOCK

FIG. 2D  ID DATA
ERROR

FIG. 2E  LATCH

METHOD OF TRANSMITTING IDENTIFICATION DATA FOR SERVO CONTROL IN A DISC PLAYER

BACKGROUND OF THE INVENTION

The present invention relates to a method of transmitting data in, for example, a digital video disc player or a digital versatile disc player (DVDP). More particularly, the invention is directed to such a disc player and a method of controlling the rate of transmitting identification (ID) data from a digital video disc to a disc player for servo control.

In general, optical disc reproducing apparatus controls servo operations based on information recorded on and read from a disc. Typically, a disc is divided into a plurality of sectors, and each sector contains ID data which represents the start of each sector and is used to discern one sector from another. In a disc player, the ID data is read and stored in an ID decoder. The ID data is then supplied to a microprocessor for controlling servo operations.

In a DVDP, for example, the speed at which ID data is read from a disc is faster than the speed at which a microprocessor can process the data. Since the ID data read from the disc is stored in the ID decoder, and then supplied without delay to the microprocessor, the microprocessor receives the next ID data before the previous ID data has been fully processed. As a result, the microprocessor cannot process and use all of the ID data stored in the ID decoder for servo control operations, thereby causing the timing and control of programs to be inefficient.

SUMMARY OF THE INVENTION

To solve the above problem, it is an object of the present invention to provide an ID data transmission method which can control the transmission rate of ID data being transmitted to a microprocessor from an ID decoder according to the data processing rate of the microprocessor.

It is another object of the present invention to provide a disc player using an ID data transmission method for servo control operation.

To accomplish the above and other objects, the present invention provides a method of transmitting ID data in a disc player which performs servo control operations using the ID data to detect a start of each sector recorded on a disc. The method includes the steps of: reading a data signal recorded on a disc, and extracting ID data from the data signal, decoding the ID data, and outputting the decoded ID data at a first transmission rate, and comparing the first transmission rate of the ID data with an ID data processing rate used in the control of servo operations, and generating a compare signal representing a difference between the first transmission rate and the ID data processing rate, and varying the first transmission rate of the decoded ID data based on the compare signal.

Further, the present invention provides a disc player for performing servo control operations using ID data, which represents a start of each sector recorded on a disc. The disc player includes an ID decoder for decoding ID data extracted from a signal recorded on the disc, and outputting the decoded ID data at a first transmission rate, and control means, coupled to the ID decoder, for performing servo control operations based on the ID data output by the ID decoder, the control means comprising means for comparing the first transmission rate with an ID data processing rate of the control means and producing a compare signal corresponding to a difference between the first transmission rate and the ID data processing rate, and means for varying the first transmission rate of the decoded ID data in the ID decoder based on the compare signal.

BRIEF DESCRIPTION OF THE DRAWINGS

Preferred embodiments of the present invention are described below in detail with reference to the accompanying drawings wherein:

FIGS. 2A through 2E illustrate waveform diagrams for certain signals of FIG.

DETAILED DESCRIPTION OF PREFERRED EMBODIMENTS OF THE INVENTION

A preferred embodiment of the present invention will be described below in detail with reference to the accompanying drawings.

Figure 1:
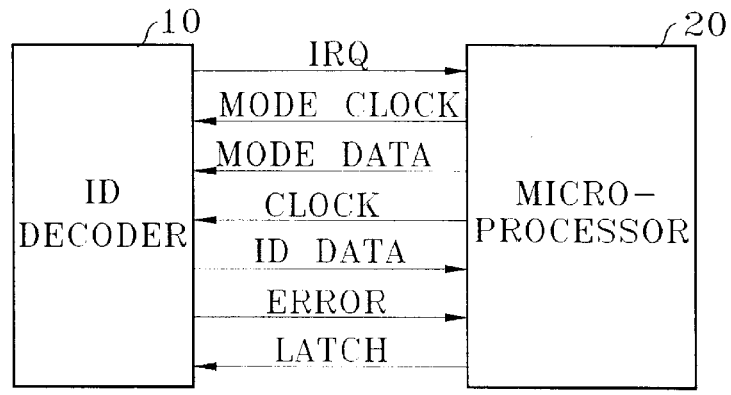
FIG. 1 illustrates a connection diagram between an ID decoder and a microprocessor for transmitting ID data in accordance with the present invention.
Figure 1:
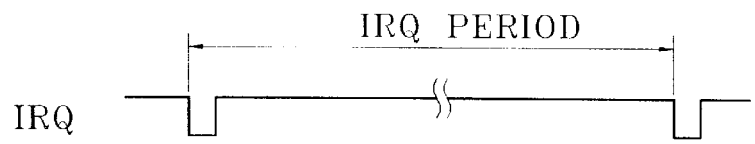
Figure 1:
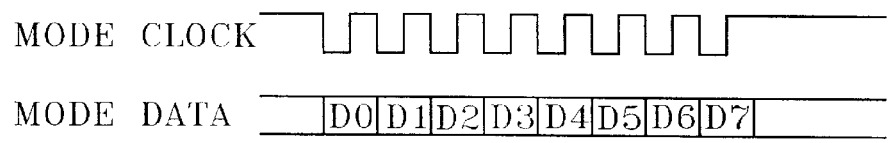
Figure 1:
Figure 1:
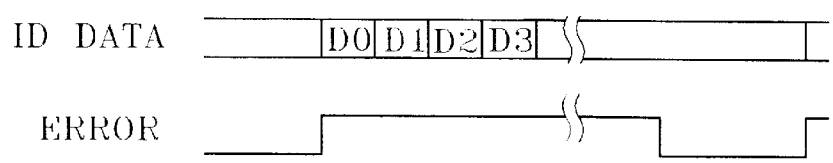
Figure 1:

Referring to FIG. 1, a transmission method according to the present invention is applied between an ID decoder 10 and a microprocessor 20, which communicates with the ID decoder 10 and other components (not shown) within a disc player. The ID decoder 10 detects ID data among the data read from an optical disc and transfers the detected ID data to the microprocessor 20. Throughout this operation, the ID decoder 10 and microprocessor 20 generate signals for the various operations in response to signal received from other components. For example, the ID decoder 10 and microprocessor generate and transmit control signals between each other to control the transfer of ID data to the microprocessor from the ID decoder.

The operation of the FIG. 1 apparatus will be described below in more detail with reference to the signal waveform diagrams seen in FIGS. 2A through 2E. The ID decoder 10 reads data from a disc, digitizes the data, and detects ID data from the digitized signals. For each sector, the ID decoder 10 generates an interrupt signal (IRQ) (FIG. 2A) and outputs the interrupt signal to the microprocessor 20. The interrupt signal (IRQ) represents that ID data has been read and is prepared to be transferred to the microprocessor 20.

The microprocessor 20 calculates the transmission rate of the ID data received from the ID decoder 10, based on the period of reception of the interrupt signal IRQ, and determines the difference (if any) between the calculated ID data transmission rate and its own data processing rate. If there is a great difference, (i.e., greater than a predetermined threshold), the microprocessor 20 generates a signal for controlling the period of generation of the interrupt signal IRQ. More specifically, the microprocessor 20 generates mode data representing a desired period of the interrupt signal IRQ, and a mode clock for transmitting the mode data to the ID decoder 10. The microprocessor 20 transmits the mode data to the ID decoder 10 in synchronization with the mode clock as shown in FIG. 2B. The following Table 1 shows an example of a period of the interrupt signal IRQ with respect to a value of the mode data.

TABLE 1

| Mode data | Period of interrupt signal (IRQ) |
|---|---|
| 00 | 1 sector |
| 01 | 2 sectors |

TABLE 1-continued

| Mode data | Period of interrupt signal (IRQ) |
|---|---|
| 02 | 4 sectors |
| 03 | 8 sectors |
| 04 | 16 sectors |

The ID decoder 10 controls the period of generation of the interrupt signal IRQ, according to the value of the mode data received from the microprocessor 20. For example, if the value of the mode data is "3", the ID decoder 10 generates an interrupt signal IRQ eight times during the time it takes to read one sector of data from the disc.

When the microprocessor 20 receives the interrupt signal IRQ, whose period is controlled from the ID decoder 10, the microprocessor 20 generates a serial clock to receive the ID data as shown in FIG. 2C, and supplies the serial clock to the ID decoder 10. The ID decoder 10 then transmits the ID data to the microprocessor 20 in synchronization with the serial clock.

The ID decoder 10 also transmits an error flag signal representing whether an error occurs in the ID data to be transmitted. If the ID data and the error flag signal are received as shown in FIG. 2D, the microprocessor 20 generates a latch signal (FIG. 2E) and latches the transmitted ID data and the error flag signal. At this time, the microprocessor 20 checks the error flag signal and discards the latched ID data, if the error flag signal represents that an error has occurred in the ID data transmitted along therewith. On the other hand, if the error flag signal represents that there is no error in the transmitted ID data, the microprocessor 20 uses the latched ID data to perform servo operations (not shown).

As described above, an ID data transmission method used in a disc player according to the present invention controls the speed at which ID data is received based on the data processing speed of a microprocessor, and efficiently performs timing and control of programs.

While only certain embodiments of the invention have been specifically described herein, it will apparent that numerous modifications may be made thereto without departing from the spirit and scope of the invention.

What is claimed is:

1. A method of transmitting ID data in a disc player which performs servo control operations using the ID data to detect a start of each sector recorded on a disc, said method comprising the steps of:

reading a data signal recorded on a disc, and extracting ID data from the data signal;

decoding the ID data, and outputting the decoded ID data at a first transmission rate; and comparing said first transmission rate of the ID data with an ID data processing rate used in the control of servo operations, and generating a compare signal representing a difference between said first transmission rate and said ID data processing rate; and varying said first transmission rate of the decoded ID data based on said compare signal.

2. The method according to claim 1, further comprising the step of generating an interrupt signal to denote that said ID data has been decoded; and determining the first transmission rate based on said interrupt signal.

3. The method according to claim 2, further comprising the step of outputting said interrupt signal with said ID data.

4. The method according to claim 1, further comprising the step of generating mode data representing a second transmission rate based on said compare signal, and varying said first transmission rate of the ID data to correspond to said second transmission rate.

5. A disc player for performing servo control operations using ID data, which represents a start of each sector recorded on a disc, said disc player comprising:

an ID decoder for decoding ID data extracted from a signal recorded on the disc, and outputting the decoded ID data at a first transmission rate; and control means, coupled to said ID decoder, for performing servo control operations based on the ID data output by said ID decoder, said control means comprising means for comparing said first transmission rate with an ID data processing rate of said control means and producing a compare signal corresponding to a difference between said first transmission rate and said ID data processing rate, and means for varying the first transmission rate of the decoded ID data in the ID decoder based on said compare signal.

6. The disc player according to claim 5, wherein said ID decoder comprises means for generating an interrupt signal and for transmitting said interrupt signal to said control means just prior to the transmission of said ID data to said control means from said ID decoder, wherein said interrupt signal represents a transmission rate of the decoded ID data to said control means.

7. The disc player according to claim 6, wherein said ID decoder generates said interrupt signal every time the ID data is decoded from a signal recorded on the disc.

8. The disc player according to claim 5, wherein said control means further comprises means for generating mode data representing a second transmission rate based on said compare signal, to vary said first transmission rate of the ID data to correspond to said second transmission rate.

9. The disc player according to claim 8, wherein said ID decoder outputs the decoded ID data at said second transmission rate according to the mode data supplied from said control means.

10. The disc player according to claim 5, wherein said ID decoder outputs the decoded ID data together with an error flag signal representing whether an error has occurred in the decoded ID data.

* * * * *